Nov. 6, 1951 G. B. FOX ET AL 2,573,836
STRAINER FOR FOOD HANDLING APPARATUS
Filed Dec. 4, 1946 3 Sheets-Sheet 2
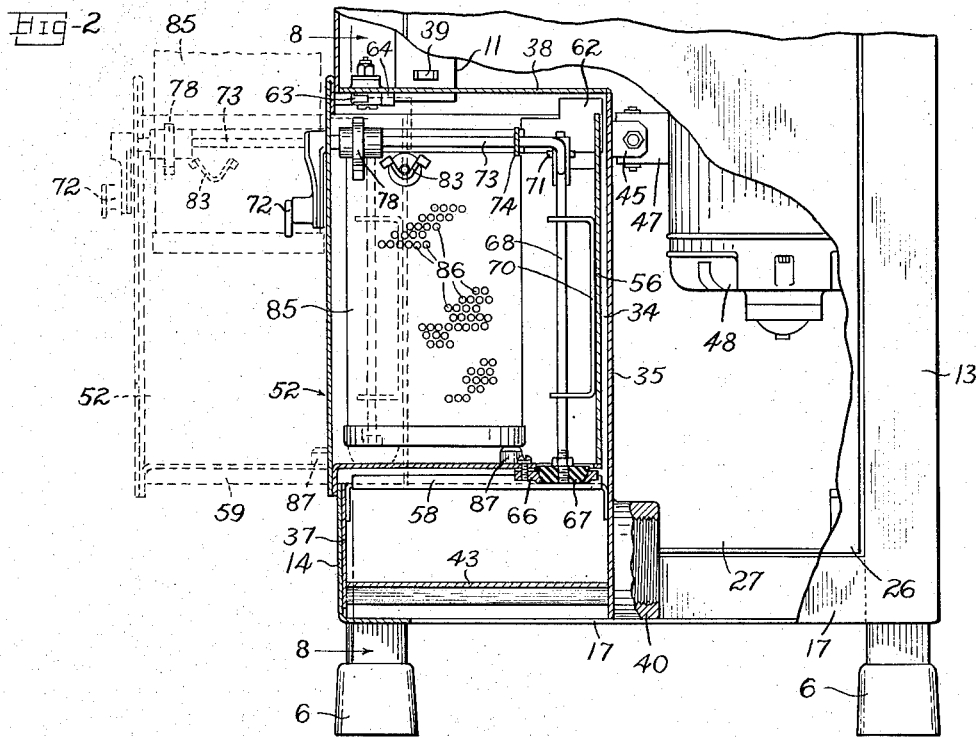
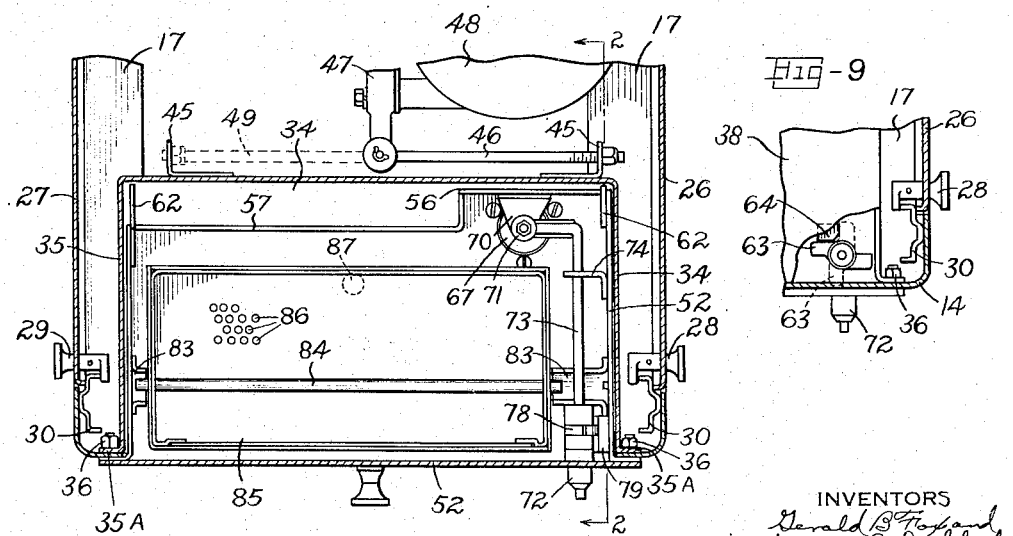
INVENTORS
Gerald B. Fox
Dewey B. Dieckhart
BY
Marechal & Biebel
ATTORNEYS Nov. 6, 1951　　　　G. B. FOX ET AL　　　　2,573,836
STRAINER FOR FOOD HANDLING APPARATUS
Filed Dec. 4, 1946　　　　　　　　　　　　3 Sheets-Sheet 3
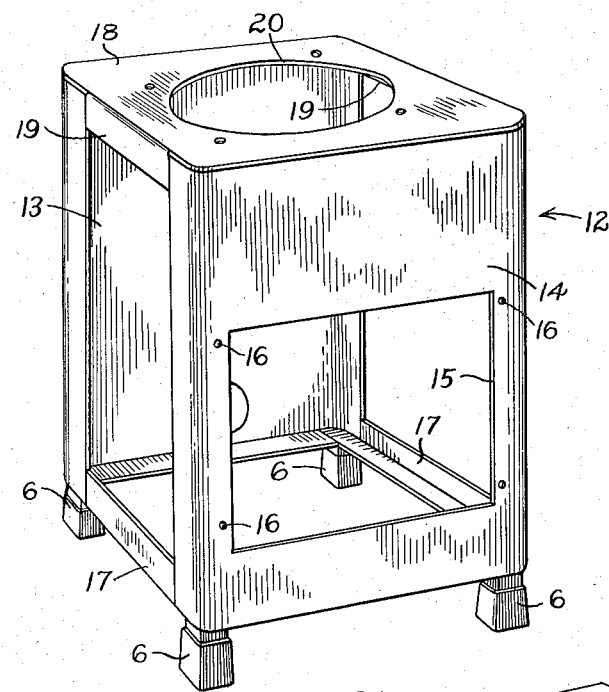
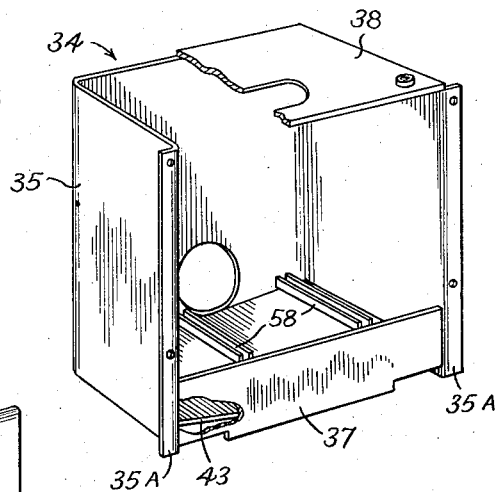
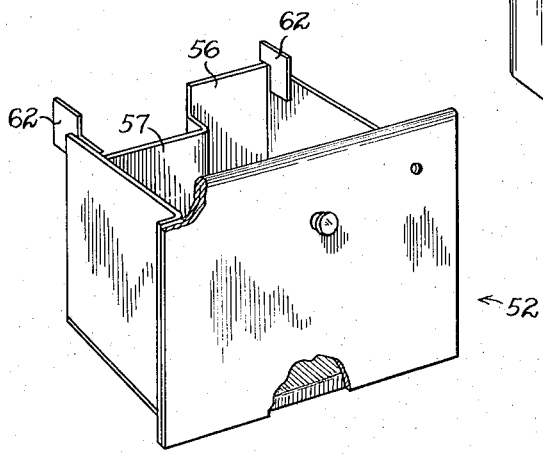
INVENTORS
Gerald B. Fox and
Dewey B. Diebehart
BY
Marechal & Biebel
ATTORNEYS Patented Nov. 6, 1951

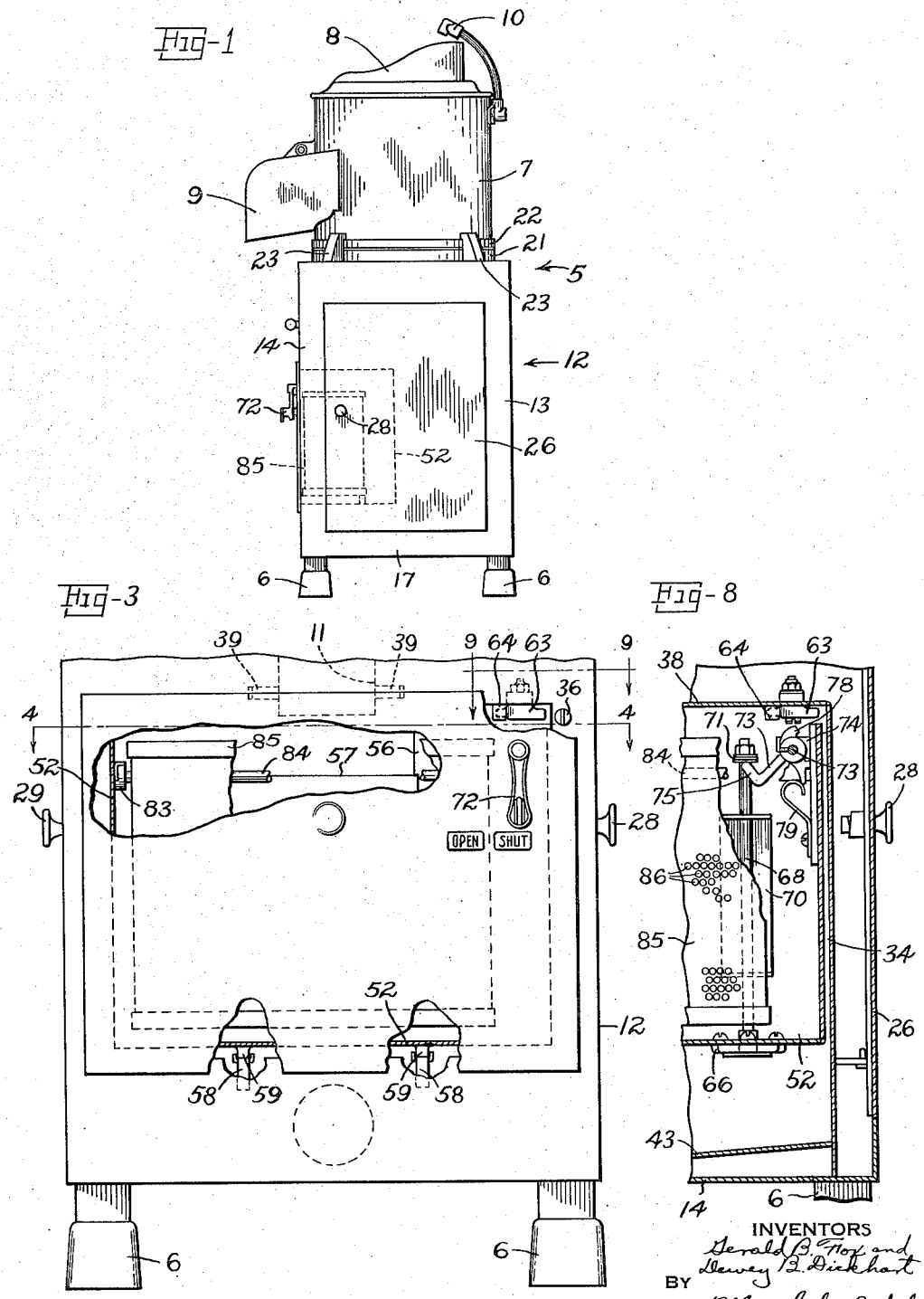

2,573,836

UNITED STATES PATENT OFFICE 2,573,836

STRAINER FOR FOOD HANDLING APPARATUS

Gerald B. Fox and Dewey B. Dickhart, Troy, Ohio, assignors to The Hobart Manufacturing Company, Troy, Ohio, a corporation of Ohio Application December 4, 1946, Serial No. 713,956

4 Claims. (Cl. 210—149)

The invention relates to food handling machines, and more particularly to a cabinet structure adapted to receive a strainer for use in connection with a peeling machine mounted therein for removing the skins from vegetables such as potatoes and the like.

One of the principal objects of the invention is to provide a vegetable peeling machine having a peel trap in its base utilizing a foraminous container constructed to receive from the machine a mixture of liquid and solid or semi-solid matter, such as vegetable peelings, skins and refuse, and separate such matter from the liquid, and which is so constructed as to avoid impeding the flow of liquid from the machine to a waste outlet because of clogging of the holes in the container.

Another object resides in the provision of a peel trap of such character including a container or basket in which the peels are caught which is immersed in a bath of water maintained at a predetermined level and in which the flow of the liquid received by the container will have such low velocity of flow, that the discharged liquid can pass effectively through the openings in the walls of the container without causing the peelings and refuse to be carried into such openings and thereby clogging them.

Still another object is to provide for a machine of the type mentioned, a peel and refuse trap or basket removably suspended in a drawer, which is slidably mounted within the machine, and wherein a supply of liquid is maintained at a level below the top of the basket, so that liquid overflowing from the drawer will not carry peelings and refuse out of the basket and into the waste trap, and which provides for easy removal of the basket and draining of water from the drawer for purposes of inspection and cleaning when desired, the drawer being properly retained against accidental or unintentional removal.

It is also one of the objects of the invention to provide a vegetable peeling machine housing constructed from a relatively few pieces which can be economically formed and assembled with a minimum of time and effort to provide a unit structure containing the peeling mechanism and adapted to receive a peel trap of the character described, or which can be used with only minor changes without the peel trap.

Other objects and advantages of the invention will be apparent from the following description, the accompanying drawings, and the appended claims.

In the drawings in which a preferred embodiment of the invention has been illustrated:

Fig. 1 is a side elevation of a peeling machine embodying the present invention;

Fig. 2 is a broken side elevation, partly in section, of the lower part of the machine shown in Fig. 1, and taken on the line 2—2 of Fig. 4, illustrating in full lines the drawer in its closed position, and in dotted lines the drawer pulled out;

Fig. 3 is a broken front elevation of the lower part of the machine shown in Fig. 1;

Fig. 4 is a broken top elevation, partly in section, taken on the line 4—4 of Fig. 3;

Fig. 5 is a perspective view of the base of the peeling machine illustrated in Fig. 1 showing the structure with the inner housing, doors and drawer removed;

Fig. 6 is a view similar to Fig. 5 showing the inner housing removed from the base, part of the top and bottom thereof being broken away and in section to more clearly illustrate the construction;

Fig. 7 is a view similar to Fig. 6 showing the drawer removed from the inner housing, part of the front panel being broken away and in section to more clearly illustrate the construction;

Fig. 8 is a broken front elevation, partly in section, taken on the line 8—8 of Fig. 2; and Fig. 9 is a broken top elevation, partly in section, of a detail shown on the line 9—9 of Fig. 3.

Referring to the drawings, a vegetable peeling machine, generally indicated by the reference numeral 5, is shown mounted on legs 6. The upper part of the machine comprises in general a hollow circular casing 7 containing the vegetable peeling mechanism which is constructed and mounted in the usual manner. Such a peeling mechanism is shown for example in the Johnston and Meeker Patent No. 1,902,506. A hopper 8 is provided through which the vegetables, such as potatoes, are fed into a rotary peeling disk and when peeled are removed through chute 9.

During peeling operations water in the form of a spray is introduced through the supply nozzle 10 and flows downwardly through the mass of vegetables to flush out and wash away the skins and portions of peeling as removed. This water, and the entrained refuse and peelings, flows into the bottom of casing 7 and then downwardly through an outlet pipe 11 and into the lower part of the machine.

The lower part of the machine, as most clearly seen in Fig. 5, comprises a hollow cabinet portion or base 12 of substantially rectangular shape and formed from pieces of sheet metal joined together as by welding. This base is enclosed on the back with a single piece 13 having its side and bottom edges bent as shown to facilitate joining this section with the front panel. The front panel is also formed from a single piece 14 similar to that used for the back, except that it is provided with a central aperture 15 through which the drawer of the machine is received, and with four small apertures 16 bored to receive screws holding the inner housing in place. Joining the front panel to the back at the bottom are two L-shaped members 17 which are held in position as by welding. At the top the front panel and the back are similarly joined as by welding in place the top cover member 18 which is formed from a flat sheet of substantially rectangular shape, and which has integral end portions 19 of sufficient length and width so that when turned down they form cross members fitting beween the front panel and the back, as shown in Fig. 5, and are joined thereto as by welding. The cover member 18 is also provided with a central opening 20 into which an annular base member 21 (Fig. 1) is secured as by welding, this member being adapted to receive the annular flange 22 formed on the lower part of casing 7. Clamps 23 fastened to cover member 18 provide means for removably securing the flange 22 to the base member 21 and serve to attach casing 7 with respect to the base 12 of the machine.

Hinged doors 26 and 27 are provided on the sides of the cabinet to permit access to the interior of the machine for inspection and cleaning purposes. These doors fit between the cross members 17 and 19 and are provided with releasable cam latches 28 and 29, Fig. 4, engageable with brackets 30 in the usual manner for holding them closed, but which on turning permit the doors to be opened readily.

When it is desired to provide a peeling machine with an enclosed and removable peel trap, an inner housing 34 of substantially rectangular shape, as shown most clearly in Fig. 6, is mounted within the cabinet portion 12. This housing 34, which is held in place therein by bolts inserted through the apertures 16 in the front panel 14, is formed of sheet metal with the side walls and back constructed preferably from a single piece 35 formed as shown. The outer edges of the side walls are formed to provide a flange 35A through which they are bolted to the front of the cabinet as shown at 36 in Fig. 4. When mounted in position within the cabinet 12 these side walls have their bottom edges resting directly upon the inner edges of the front piece 14 and of members 17. It will be noted also that the back wall has an aperture formed therein against which the outlet pipe 40 is received.

Extending across the front of the housing 34 between the side walls and positioned near the bottom thereof is a front enclosing member 37 which is fastened at each end to the side walls and to the bottom as by continuous welding. There is thus provided a housing 34 which is substantially enclosed on all sides when it is mounted in position within the cabinet 12 which prevents the liquid and particles flowing from the outlet pipe 11 from splashing into the interior of the cabinet and thereby protects the motor and other parts of the peeling mechanism.

The top 38 of the housing 34 is integrally joined to the side walls and back wall and has an aperture formed therein into which the outlet pipe 11 is received. As shown in Figs. 2 and 3 the lower end of this outlet pipe is provided with lugs 39 projecting from each side thereof which serve as a connection for a separate pipe when it is desired to operate the machine with the peel trap removed, or when a machine is used in which a peel trap is not provided. Thus a single base or cabinet portion 12 serves for both types of machines.

Positioned within the housing 34 and integrally joined to the side walls and back wall at the bottom, as well as to the cross member 37, is a sloping V-shaped bottom piece 43. Liquid draining through the peel trap collects on this bottom piece, the slope of which is such that it runs back and out through pipe 40, Fig. 2, which is fitted against an aperture provided in the back wall of the housing 34 and in turn is connected to a drainage outlet or sewer.

Attached to the back wall of housing 34 is an L-shaped bracket 45 drilled to threadedly receive an adjusting rod 46 which is pivotally connected to a supporting frame 47 forming a belt adjustment for the power source 48, such as an electric motor, provided to drive the peeling mechanism in the upper part of the machine. An alternative mounting position for rod 46 is shown in dotted lines as at 49 in Fig. 4.

A slidably mounted and removable drawer, generally indicated by the reference numeral 52, Fig. 7, is positioned within housing 34 below the lower end of outlet pipe 11. This drawer is open on the top, but is enclosed on both sides, the front, the back and bottom by flat substantially rectangular pieces of sheet metal all integrally joined together, as by welding, to form a liquid-tight compartment. It is to be noted that the back wall 56 of the drawer, as seen in Fig. 7, is bent to form an offset portion 57 which is also at a generally lower level than the rest of the back as shown in Fig. 3.

To support the drawer above the bottom of housing 34 a pair of channel members 58 are fastened across the interior and extend from the top of the front cross member 37 to the back wall thereof. These members have their upper edges formed to provide a substantially U-shaped channel, Fig. 6, into which the rails 59, Figs. 2 and 3, formed as an integral part of the bottom of the drawer are slidably mounted, and which permit the drawer to be slid into and out of the housing 34. The drawer can be drawn forwardly to an open position determined by engagement of the stop members 62 with the adjustable stop members 63, Fig. 2. Stop members 63 are, however, provided with friction washers which permit the arms thereof to be manually turned to the dotted line position shown in Fig. 9 and thereby allowing the stop members to clear and the drawer to be removed entirely from housing 34 and cabinet 12. To prevent the drawer from being removed from the cabinet inadvertently, a metal stop block 64 is secured as by welding to the under side of member 38. This block is positioned so as to engage the arms of the stop member 63 and prevent further rotation thereof when they are turned to the positions indicated in Fig. 9. The drawer pulled out to the open position against the stops is shown in dotted line form in Fig. 2.

An aperture is provided in the bottom of the drawer 52 into which a valve seat 66 is bolted and adapted to seat therein is a valve 67 of generally spherical shape which is removably mounted on a plunger 68. The outer edges of the seat are so tapered that when the valve is seated a substantially liquid-tight line contact seal is provided and the drawer, having no other outlets, will fill with liquid flowing from the outlet pipe 11 to a level equal with the lowered offset portion 57 of the drawer back wall 56. Liquid then spills over this lower portion of the back wall along its extended length and collects in the bottom of housing 34 before draining from the outlet pipe 40.

Plunger 68 which is provided to raise and lower valve 67, is reciprocably mounted in a bracket 70, carried on the back wall 56 of the drawer, and has threaded to the upper end thereof a cap piece 71. To raise and lower the plunger and its attached valve 67, there is provided a handle 72 operable from the front of cabinet 12 which is connected to a lever 73 which is rotatably mounted in a bracket 74 fastened to the inside of the drawer side wall. The inner end of this lever is bent to form a link 75 one end of which is positioned so as to fit under the cap piece 71. Thus movement of the handle 72 from the shut position to the open position, Fig. 3, rotates lever 73 clockwise thereby raising link 75 to lift plunger 68 and the attached valve 67 from seat 66, and a reverse movement of handle 72 permits the valve to close. In order to facilitate holding valve 67 open when it is desired to drain the liquid from the drawer, and without requiring the operator to hold handle 72 at the open position until this operation is completed, the outer end of lever 73 has mounted thereon a flat cam member 78 provided with a hook portion, as illustrated in Fig. 8, adapted to frictionally engage with the upper bowed end of a spring tensioning latch 79 bolted to the inside of drawer 52. This provides means which will hold the valve open once cam 78 is turned so that its hook portion is rotated over the bowed end of latch 79, and conversely valve 67 is locked in the closed position until sufficient pressure is applied to handle 72 to force cam 78 out of engagement with latch 79.

U-shaped brackets 83 mounted upon opposite sides of the interior of drawing 52 removably support the ends of a rod 84 which is welded to and forms a lifting support for the perforated container or basket 85 suspending the same within the drawer 52. This basket, which is open at the top, is enclosed on all sides and the bottom by flat substantially rectangular sheets of foraminous material the openings or perforations 86 of which are of such size that peelings, skins and other refuse from the vegetable peeling machine will collect therein as they flow from outlet pipe 11 and not pass into the interior of the drawer. Thus only very fine particles of matter and pieces so small as not to have a tendency to clog drains or sewers will pass through with the liquid discharged therefrom. Since the basket 85 is open at the top, to prevent material collected therein from flowing over the top edges and down into the drawer the brackets 83 are positioned sufficiently high within the interior of the drawer so that when the supporting rod 84 of the basket is mounted in place in brackets 83 the top of the basket always extends above the level of the liquid flowing over the drawer edge 57. To prevent the basket from tipping, a lug 87 is fastened to the bottom at the inner end thereof to form a support resting on the bottom of the drawer, the rod 84 as shown in Fig. 4 being located closer to the front of the basket so that its weight will normally overbalance it down against the supporting lug 87.

From the above description it will be apparent that when basket 85 is positioned in the drawer 52 it is directly under outlet pipe 11 leading from the peeling machine. Peelings, skins and refuse carried with the stream of liquid discharged from this pipe collect therein and do not pass through into the drawer. In use valve 67 is closed, and the peelings and liquid discharge from the machine directly into the open top of the basket. The liquid drains through the basket and fills the drawer up to the overflow level 57 which extends along the greater part of the rear wall of the drawer. There is thus provided a large overflow area which establishes a low velocity of flow at any point thereof, thus immersing the greater part of the perforate wall of the basket, and the drawer and the basket fill up with liquid, the liquid flowing from the basket to the drawer at a low velocity. The upper part of the basket is thus always kept open and in functioning condition because the low velocity of flow does not cause the peelings to deposit on the perforate walls. This avoids the tendency of peelings and skins to collect upon and fill up the perforations in the basket as would be the case where there is no liquid level maintained outside of and surrounding the basket.

When it is desired to remove the basket from the drawer for cleaning and removal of peelings and refuse, valve 67 is opened and the liquid drains from the interior thereof; the drawer then being pulled forward to the stop position, the basket then can be lifted directly out of the drawer. The basket can then be dumped, cleaned and returned to operative position, and when desired the entire drawer can also be removed by releasing the stops as above described. The entire structure therefore is simple and economical in manufacture and highly advantageous, providing for continuing and complete separation of the peelings and refuse from the liquid, the liquid being continuously discharged and the peelings being collected in a position from which they can be quickly and easily withdrawn and periodically disposed of.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A vegetable peeling machine comprising a housing adapted to support the peeling mechanism, a drawer slidably mounted in said housing and adapted to contain a bath of liquid, an overflow outlet from said drawer at a position spaced substantially above the bottom of said drawer to maintain said bath at a substantial depth, a container of foraminous material positioned in said drawer to receive a stream of liquid from said peeling mechanism carrying entrained solid and semi-solid matter, said container being proportioned to extend above the level of said overflow outlet but with the major portion thereof below said outlet and submerged in said bath for continuous low velocity discharge of liquid through the walls thereof over substantially the entire surface thereof while retaining said entrained matter therein, a discharge outlet in said drawer below said container for emptying said bath from said drawer, a closure for said discharge outlet, and means operable from outside said housing for opening said closure to effect discharge of said bath from said drawer prior to opening said drawer for removal of said container to empty said retained matter therefrom.

2. A vegetable peeling machine comprising a housing adapted to support the peeling mechanism, a drawer slidably mounted in said housing and adapted to contain a bath of liquid, a container of foraminous material positioned in said drawer to receive a stream of liquid from said peeling mechanism carrying entrained solid and semi-solid matter, a portion of one wall of said drawer being of lesser height than the remainder of said walls to form an overflow outlet from said drawer, said overflow outlet being spaced substantially above the bottom of said drawer to maintain said bath at a substantial depth, said container being proportioned to extend above the level of said overflow outlet but with the major portion thereof below said outlet and submerged in said bath for continuous low velocity discharge of liquid through the walls thereof over substantially the entire surface thereof while retaining said entrained matter therein, said overflow outlet being of substantial lateral extent to provide a relatively low volume of flow at any point along the length thereof for avoiding local collection and deposit of said retained matter upon the walls of said container, a discharge outlet in said drawer below said container for emptying said bath from said drawer, a closure for said discharge outlet, and means for operating said closure to provide for discharge of said bath from said drawer.

3. A cabinet for supporting a vegetable peeling machine having a discharge pipe through which a water suspension of peelings is discharged, comprising a hollow base adapted to support said machine, said base having an opening in the front wall thereof and having a discharge outlet in another wall thereof, an inner housing positioned within said base to form a compartment separate from the remainder of said base and leaving a space within said base for receiving a motor for driving said peeling machine, said housing having an opening in the front thereof coinciding with said opening in said base, a drawer adapted to be received within said opening, means within said housing supporting said drawer for movement therein above the bottom thereof to leave a space within said compartment below the bottom of said drawer, said housing having an outlet therefrom below said drawer for connection with said discharge outlet from said base, a foraminous basket adapted to be received within said drawer in position to receive said discharge from said discharge pipe of said peeling machine, a discharge outlet in the bottom of said drawer for discharging liquid draining from said basket to said space at the bottom of said housing, a closure for said discharge outlet from said drawer, and means operable from outside said housing for opening said closure to empty accumulated liquid from said drawer prior to opening said drawer for removal and emptying of said basket.

4. A cabinet for supporting a vegetable peeling machine having a discharge pipe through which a water suspension of peelings is discharged, comprising a hollow base adapted to support said machine, said base having an opening in the front wall thereof and having a discharge outlet in another wall thereof, an inner housing positioned within said base to form a compartment separate from the remainder of said base and leaving a space within said base for receiving a motor for driving said peeling machine, said housing having an opening in the front thereof coinciding with said opening in said base, a drawer adapted to be received within said opening, means within said housing supporting said drawer for movement therein above the bottom thereof to leave a space within said compartment below the bottom of said drawer, said housing having an outlet therefrom below said drawer for connection with said discharge outlet from said base, a foraminous basket adapted to be received within said drawer in position to receive said discharge from said discharge pipe of said peeling machine, said drawer having an overflow outlet therefrom positioned below the top of said basket but substantially above the bottom of said basket to maintain a bath of liquid of substantial depth within said drawer, a discharge outlet in the bottom of said drawer below said basket, a closure for said discharge outlet from said drawer, means operable from outside said housing for opening said closure to empty said bath from said drawer prior to opening said drawer for removal and emptying of said basket, and a door in a wall of said base for providing access to said space therein independently of said housing.

GERALD B. FOX.
DEWEY B. DICKHART.

REFERENCES CITED

The following references are of record in the file of this patent:

UNITED STATES PATENTS

| Number | Name | Date |
|---|---|---|
| 745,963 | Koslapsky | Dec. 1, 1903 |
| 1,116,913 | Peregoy | Nov. 10, 1914 |
| 1,244,452 | Hamlin | Oct. 23, 1917 |
| 1,287,856 | Brandt | Dec. 17, 1918 |
| 1,902,506 | Johnston et al. | Mar. 21, 1933 |
| 1,903,623 | Howe | Apr. 11, 1933 |
| 2,121,719 | Travaglini | June 21, 1938 |
| 2,199,792 | Haberstump | May 7, 1940 |
| 2,201,790 | Rouch | May 21, 1940 |
| 2,343,743 | Breckenridge | Mar. 7, 1944 |
| 2,360,278 | Robertson | Oct. 10, 1944 |
| 2,413,954 | Conterman | Jan. 7, 1947 |
| 2,416,837 | Meyer | Mar. 4, 1947 |
| 2,462,595 | Benedict | Feb. 22, 1949 |